United States Patent
Kothmann

[15] 3,677,564
[45] July 18, 1972

[54] SAFETY TRAILER HITCH

[72] Inventor: Gilbert C. Kothmann, P.O. Box 680, Mason, Tex. 76856

[22] Filed: March 27, 1970

[21] Appl. No.: 23,373

[52] U.S. Cl..............................................280/457, 280/511
[51] Int. Cl..........................................................B60d 1/12
[58] Field of Search.................................................280/457

[56] References Cited

UNITED STATES PATENTS

| | | | |
|---|---|---|---|
| 2,650,101 | 8/1953 | Frankfother............................280/457 |
| 2,139,970 | 12/1938 | Moore....................................280/491 |

FOREIGN PATENTS OR APPLICATIONS 560,939  4/1957  Italy........................................280/457

Primary Examiner—Leo Friaglia
Attorney—Berman, Davidson and Berman

[57] ABSTRACT

A safety trailer hitch in which a yoke is secured to the tow bar of the trailer and to the hitch of the towing vehicle to prevent the trailer from becoming disconnected should the socket portion on the trailer become detached from the ball. The yoke may be easily disconnected from the trailer hitch when disconnecting the trailer from the towing vehicle. In a modified form of the invention a finger on the trailer hitch is arranged to be swung into a position overlying the socket to prevent the socket from detaching from the ball. When disconnecting the trailer the finger is swung out of the way to permit the socket to be lifted off of the ball.

5 Claims, 16 Drawing Figures

Patented July 18, 1972

INVENTOR.
GILBERT C. KOTHMANN,
BY
Berman, Davidson & Berman,
ATTORNEYS.

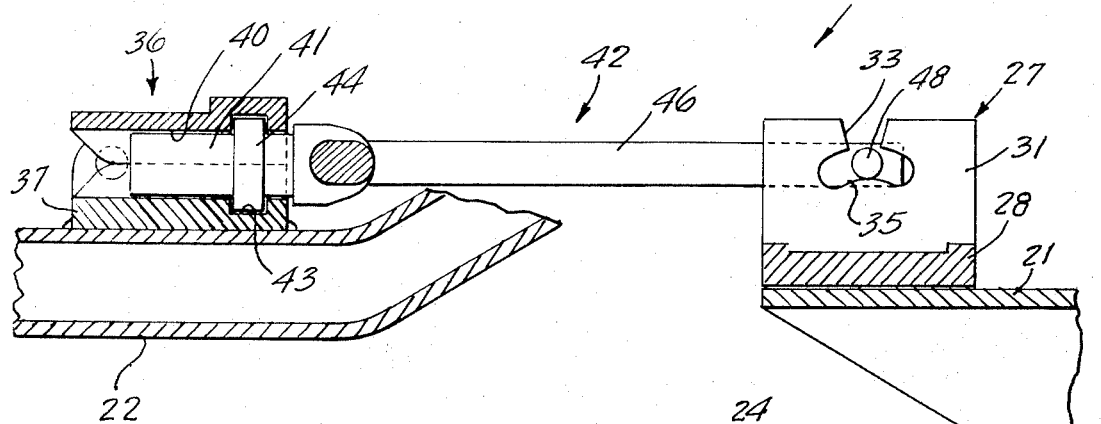
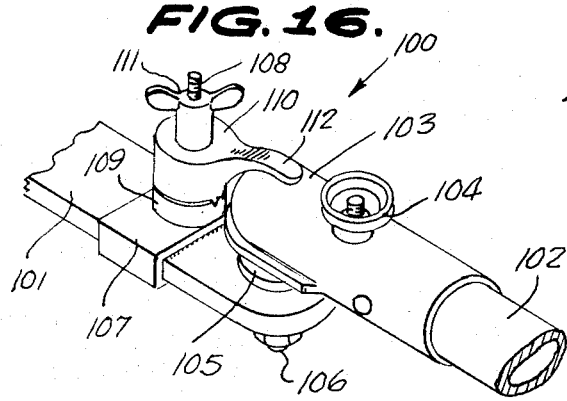
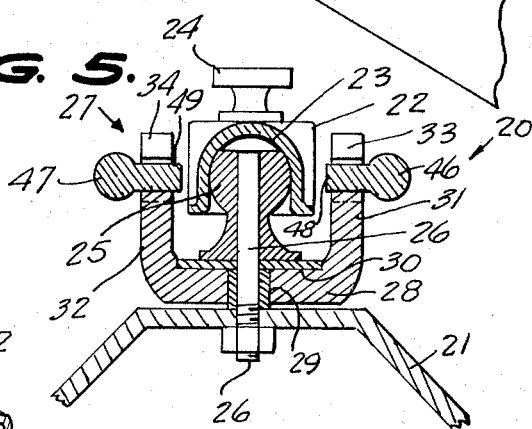
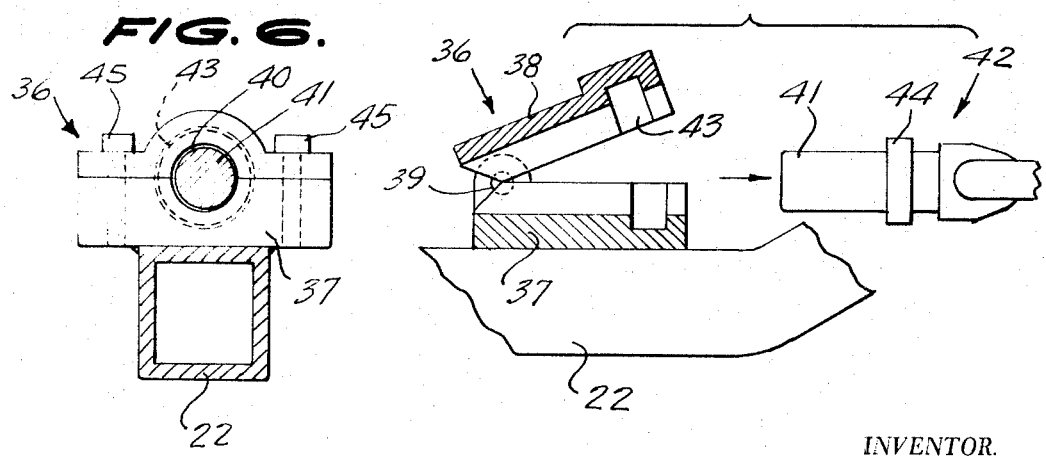

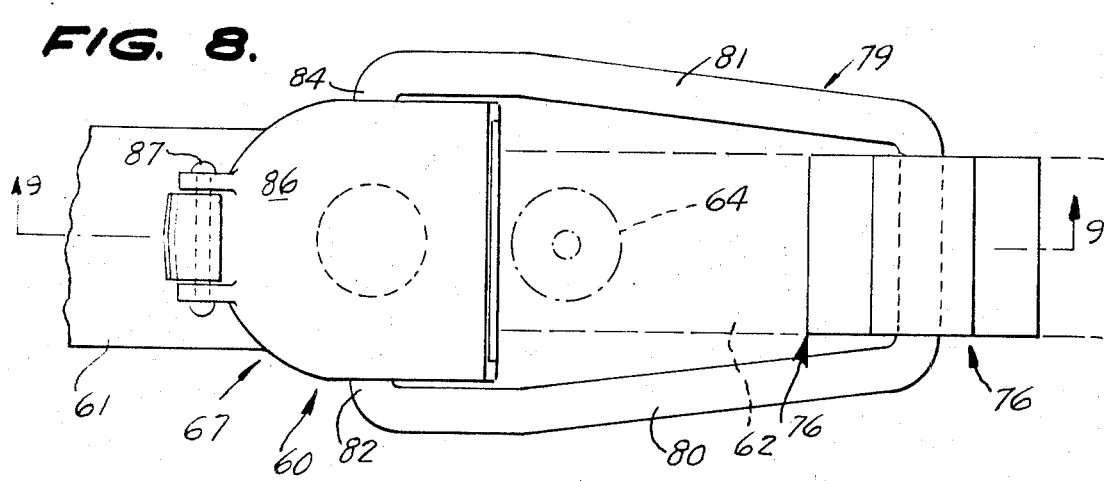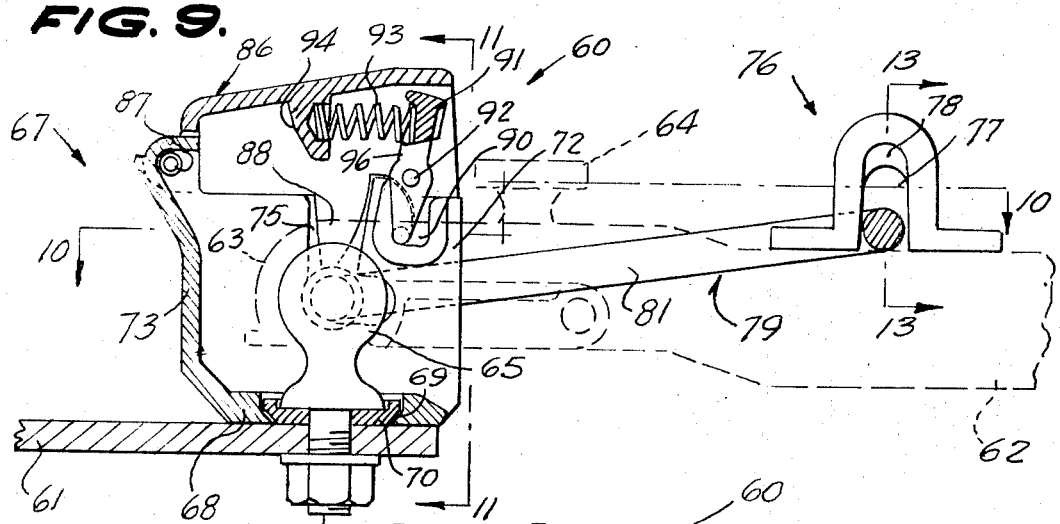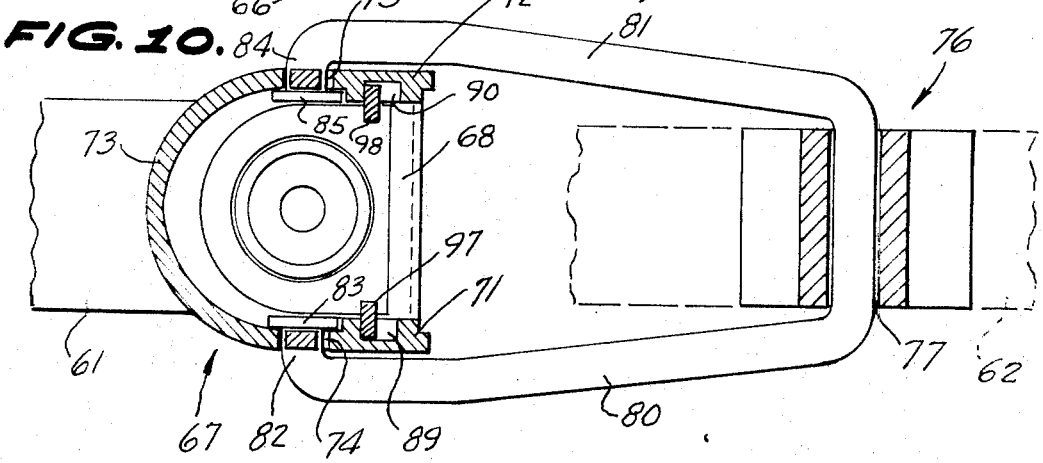

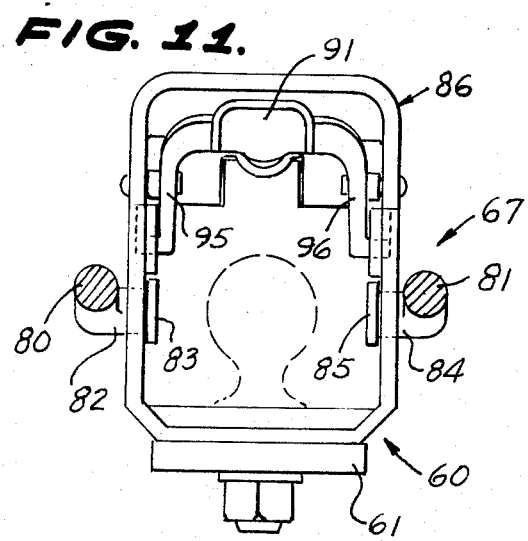

SAFETY TRAILER HITCH

BACKGROUND OF THE INVENTION

1. Field of the Invention

The present invention relates to safety trailer hitches of the type normally used to tow boat trailers, utility trailers, camping trailers, and the like with a passenger automobile or light truck.

2. Description of the Prior Art

In the prior art devices it has been normal to use safety chains between the trailing and towing vehicles, to maintain the alignment of the trailing vehicle with the towing vehicle, should the socket become disconnected from the ball. A considerable amount of slack is required in the chains to permit the normal swiveling action of the trailer and this slack creates problems when the hitch breaks or becomes disconnected and the only connection between the trailer and the towing vehicle is the chains. The trailer is then permitted to whip from side to side due to the slack in the chains and many wrecks have been traced to this whipping action which caused the driver of the towing vehicle to lose control of the car.

SUMMARY OF THE INVENTION

The present invention includes a yoke system for connecting the trailer tongue to the trailer hitch of the towing vehicle in addition to the normal ball and socket connection therebetween. The yoke is mounted so as not to restrain the normal relationship between the trailer coupling and the trailer hitch on the towing vehicle except when breakage or other disconnection therebetween occurs. In one form of the invention a finger is releasably positioned to overlie the trailer socket to prevent it from being disengaged from the ball.

The primary object of the invention is to provide a safety yoke connection for maintaining the safe coupling of a trailer with its towing vehicle in the event the normal coupling becomes broke or disengaged.

Other objects and advantages will become apparent in the following specification when considered in light of the attached drawings.

BRIEF DESCRIPTION OF THE DRAWINGS

FIG. 4 is a longitudinally sectional view taken along the line 4—4 of FIG. 1 looking in the direction of the arrows;

FIG. 5 is a transverse sectional view taken along the line 5—5 of FIG. 2 looking in the direction of the arrows;

FIG. 6 is a transverse sectional view taken along the line 6—6 of FIG. 2 looking in the direction of the arrows;

FIG. 7 is a view similar to FIG. 4 showing the release of the yoke from the trailer;

FIG. 8 is a top plan view of a modified form of the invention;

FIG. 9 is a longitudinally sectional view taken along the line 9—9 of FIG. 8 looking in the direction of the arrows;

FIG. 10 is a horizontal sectional view taken along the line 10—10 of FIG. 9 looking in the direction of the arrows;

FIG. 11 is a transverse sectional view taken along the line 11—11 of FIG. 9 looking in the direction of the arrows;

FIG. 12 is a front elevation of the invention shown partially in section for convenience of illustration;

FIG. 13 is a transverse sectional view taken along the line 13—13 of FIG. 9 looking in the direction of the arrows;

FIG. 14 is a view similar to FIG. 9 in reverse illustrating the disconnection of the yoke from the hitch;

FIG. 15 is a detailed sectional view similar to FIG. 9 illustrating a modified form of the invention; and FIG. 16 is a fragmentary perspective view of another modified form of the invention.

DESCRIPTION OF THE PREFERRED EMBODIMENT

Figure 1:
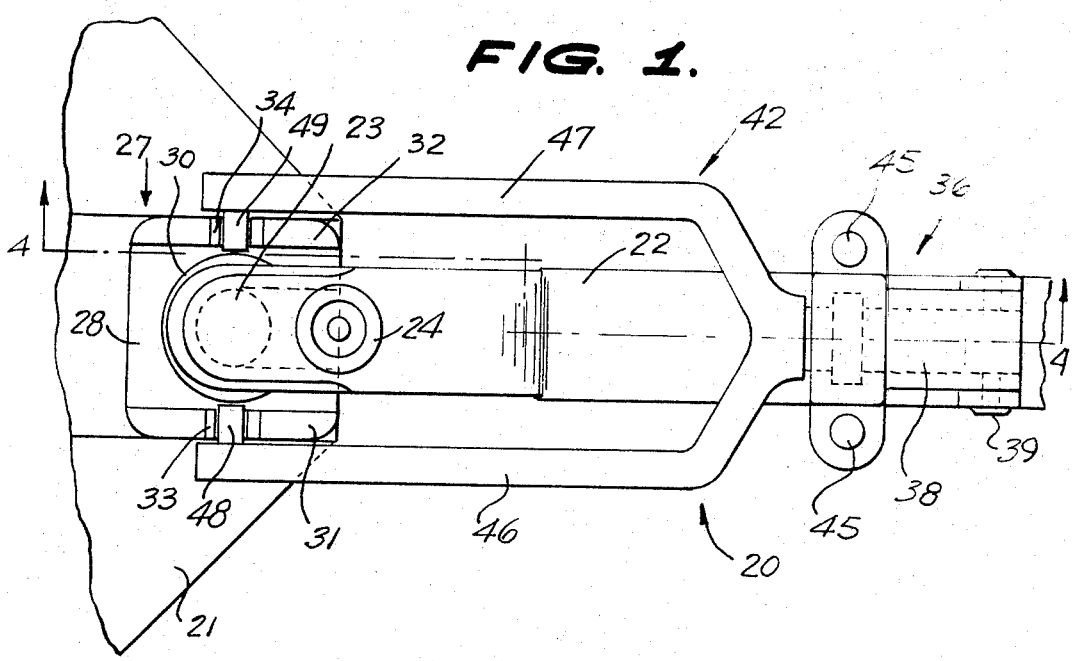
FIG. 1 is a top plan view of the invention.
Figure 2:
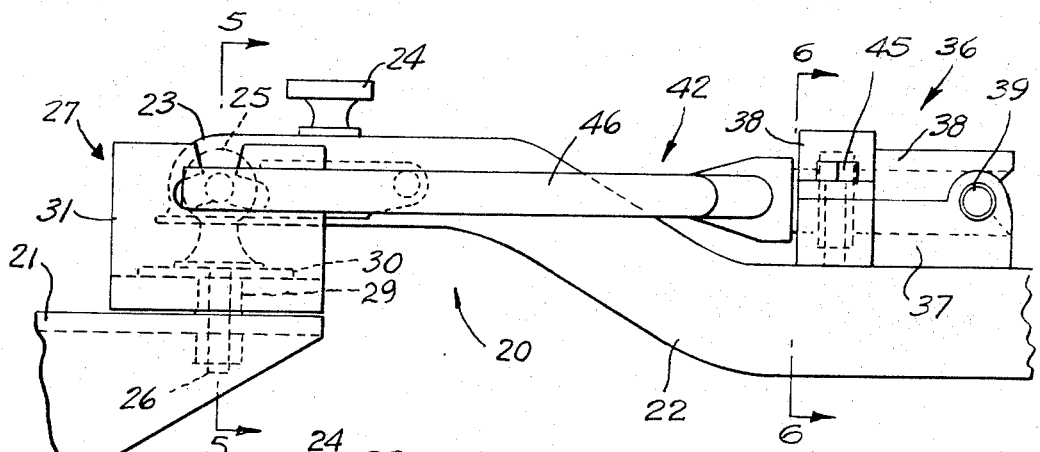
FIG. 2 is a side elevation of the invention.

Referring now to the drawings in detail wherein like reference characters indicate like parts throughout the several figures the reference numeral 20 indicates generally a safety trailer coupling constructed in accordance with the invention.

The coupling 20 includes a rigid hitch element 21 forming a part of or rigidly connected to a towing automobile (not shown) in a conventional manner. A tongue 22 extends forwardly from the trailing vehicle to cooperate with the hitch 21. A socket 23 is integrally secured to the forward end of the tongue 22 and has a hand wheel 24 associated therewith for clamping the socket 23 onto a ball 25 secured by a bolt 26 to the hitch 21.

A connector generally indicated at 27 includes a generally rectangular base plate 28 mounted on a bushing 29 carried by the bolt 26 above the hitch 21. The bushing 29 is slightly longer than the thickness of the base plate 28 so that the base plate 28 is free to swivel thereabout. A washer 30 is positioned in contact with the upper face of the base plate 28 and the ball 25 is positioned thereon. A generally rectangular side wall 31 extends upwardly from the side edge of the base plate 28 perpendicularly thereto. A second side wall 32 extends upwardly from the opposite side of the base plate 28 parallel to the side wall 31. The side walls 31, 32 are spaced apart sufficient to receive the socket 23 therebetween as can be clearly seen in FIGS. 3 and 5. An inverted generally T-shaped slot 33 is formed centrally of the upper edge of the side wall 31 and an identical generally T-shaped slot 34 is formed centrally of the upper edge of the side wall 32. The lower edge of the T-shaped slots 33, 34 are formed convexly arcuate at 35 for reasons to be assigned.

A yoke socket generally indicated at 36 includes a base member 37 rigidly secured to the tongue 22 and a cap member 38 is pivotally secured thereto by a pivot pin 39 extending transversely of the tongue 22. The cap member 38 and the base member 37 in closed position have a central bore 40 to receive a cylindrical portion 41 of the safety yoke generally indicated at 42. An annular groove 43 is formed in the socket member 36 communicating with the bore 40 to receive an annular shoulder 44 formed on the cylindrical portion 41 of the yoke 42. A pair of bolts 45 extend through the cap member 38 into the base member 37 to lock the socket member 36 onto the yoke 42. The fit of the cylindrical portion 41 in the bore 40 and the fit of the shoulder 44 in the groove 43 is such that with the socket 36 bolted closed by the bolts 45 the yoke is free to rotate about its longitudinal axis.

Figure 3:
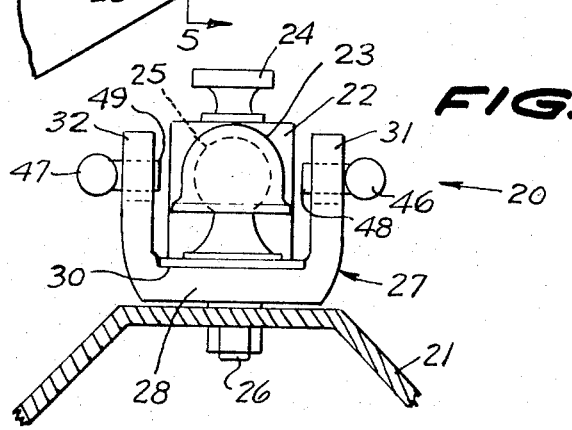
FIG. 3 is a front elevation of the invention.

The yoke 42 includes a pair of longitudinally extending arms 46, 47 and arranged in parallel relation spaced apart a distance slightly greater than the distance between the outside of the side walls 31, 32 as can be seen in FIG. 3. The arm 46 has a pin 48 which extends horizontally inwardly to engage in the T-shaped slot 33. The arm 47 has a pin 49 extending horizontally inwardly thereof and axially aligned with the pin 48. The pin 49 engages in the T-shaped slot 34 with the yoke 42 in operating position.

In the use and operation of the invention illustrated in FIG. 1 through 7 the socket 23 is positioned in the ball 25 and the hand wheel 24 is tightened to clamp the socket 23 thereon. The yoke 42 simultaneously engages the pins 48, 49 thereof in the T-shaped slots 33, 34 and the towing vehicle is fully connected to the trailer for operation. The connector 27 is adapted to swivel about the vertical axis bushing 29 as the socket 23 swivels about the ball 25 during turning movements of the towing vehicle. In the event that disconnection of the socket 23 from the ball 25 occur the pins 48, 49 engage within the front or rear portions of the T shaped slots 33, 34 to maintain the connection between the trailer and the towing vehicle. Obviously the T-shaped slots 33, 34 will retain the pins 48, 49 therein when the trailing vehicle is being pulled by the towing vehicle or when the trailing vehicle is being slowed by the towing vehicle. Swiveling movement of the yoke 42 with respect to the tongue 22 is permitted by the socket 36 so that in the situation where the trailing vehicle transversely tilts with respect to the towing vehicle no strain is placed on the safety coupler 20.

Referring now to FIG. 8 though 14 a modified form of the invention is illustrated wherein the reference numeral 60 indicates generally a safety coupler for connecting a trailing vehicle to a towing vehicle. A safety coupler 60 includes a rigid hitch element 61 which is connected to or forms a part of the towing vehicle and a tongue 62 which extends forwardly of a trailing vehicle (not shown).

A socket 63 is rigidly mounted on the forward end of the tongue 62 and has a hand wheel 64 associated therewith for clamping the socket 63 on a ball 65 connected by a bolt 66 to the hitch member 61.

A housing generally indicated at 67 includes a bottom wall 68 having a cone shaped opening 69 extending therethrough. A cone shaped washer 70 engages about the bolt 66 and against the hitch 61 centrally of the cone shaped opening 69 so as to retain the bottom wall 68 in its position on the hitch 61 with enough slack allowed to permit the housing 67 to swivel about the washer 70 freely.

The housing 67 includes an upright side wall 71 on one side of the base 68 and a second upright side wall 72 on the opposite side of the base 68. An upright generally U shaped front wall 73 connects the side wall 71, 72 completing the lower portion of the housing 67. The side wall 71 has an L-shaped slot 74 opening downwardly therein from the upper surface thereof and the side wall 72 has an L-shaped slot 75 opening downwardly therein from the upper surface thereof.

A yoke support generally indicated at 76 is rigidly secured to the tongue 62 and includes a transverse slot 77 having a V-shaped top wall 78. A yoke generally indicated at 79 is mounted through the slot 77 and includes an arm 80 extending forwardly from one side thereof and a similar arm 81 extending forwardly from the opposite side thereof. The arm 80 has an offset portion 82 extending inwardly therefrom and having a head 83 on its inner terminal end. The arm 81 has an offset end portion 84 extending inwardly thereon and having a head 85 on the inner end thereof. The offset portions 82, 84 and the heads 83, 85 are arranged in transversely aligned relation with the offset portions 82, 84 being adapted to engage in the L-shaped slots 74, 75 respectively with the heads 83, 85 preventing the offset portions 82, 84 from disengaging laterally from the slots 74, 75 respectively.

A cover generally indicated at 86 is hingedly connected to the housing 67 by a hinge pin 87. The cover 86 has a tongue 87 on one side thereof positioned to engage in the slot 74 with the cover 86 in closed position. A second tongue 88 is formed on the opposite side of the cover 86 to engage in the slot 75 with the cover closed.

The side wall 71 has an L-shaped slot 89 formed therein rearwardly of the L-shaped slot 74. The side wall 72 has an L-shaped slot 90 formed therein rearwardly of the L-shaped slot 75.

A latch bar 91 is pivotally mounted in the cover 86 on transverse pivot pins 92 and a coil spring 93 extends between the latch bar 91 and a boss 94 on the cover 86. The latch bar 91 is normally urged rearwardly in the cover 86. A depending arm 95 is integrally formed on one end of the latch bar 91 and a depending arm 96 is integrally formed on the other end of the latch bar 91. A latch pin 97 is carried by the lower end of the arm 95 and a latch pin 98 is carried by the lower end of the arm 96 for engagement respectively in the L-shaped slots 89, 90 to thus lock the cover 86 in its closed position with the tongues 87, 88 respectively retaining the offset portions 82, 84 in their lower positions within the slots 74, 75 respectively.

In the use and operation of the invention the socket 63 is clamped to the ball 65 in a conventional manner and the yoke 79 is dropped into the slot 74, 75 and the cover 86 is then closed and latched. The yoke 79 can swivel around a longitudinal axis due to the height of the slot 77 and the V-shaped upper wall 78 thereof. To prevent the safety coupler 60 from being placed under strain when the trailer tilts around its longitudinal axis with respect to the towing vehicle. As the towing vehicle turns a corner the housing 67 swivels about the washer 70 to permit the yoke 80 to stay in aligned relation with respect to the slots 74, 75. In the event that the socket 63 should become disengaged from the ball 65 the yoke 79 will retain the connection between the towing vehicle and the trailing vehicle.

In the modification illustrated in FIG. 15 the housing 67' is identical to the housing 67 except that the conical bore 69' is somewhat larger to accommodate a conical washer 70' having a somewhat larger diameter. An annular flange F on the washer 70' over the bottom wall 68' of the housing 67'. The bolt 66' of the ball 67'. The bolt 66' of the ball 65' is somewhat larger in diameter than the bolt 66 and the changes in the bottom wall 68', washer 70' and the conical bore 69' permit the use of the larger bolt 66'. It should be noted that the housing 67' is permitted to swivel about the washer 70' in the same manner as the housing 67. In all other respects the modification illustrated in FIG. 15 is identical to that of the form of the invention illustrated in FIGS. 8 though 14.

In FIG. 16 another modified form of the invention is illustrated wherein a safety coupler is indicated generally at 100. The safety coupler 100 includes a rigid hitch element 101 secured to or forming a part of the towing vehicle and a tongue 102 extending forwardly from a trailing vehicle. A socket member 103 is secured to the forward end of the tongue 102 and has a hand wheel 104 for clamping the socket member 103 to a ball which is secured to the hitch 101 by a bolt 106. The construction of the hitch member 101, tongue 102, socket 103, hand wheel 104, ball 105 and bolt 106 are all of conventional construction and operate in the conventional manner.

A base member 107 is welded to the hitch 101 forwardly of the ball 105 and has an upstanding bolt 108 secured thereto. A spacer 109 is mounted on the pipe 107 around the bolt 108 and a retainer 110 is mounted on the bolt 108 in contact with a spacer 109 for rotation thereon. A wing nut 111 is mounted on the bolt 108 to engage the retainer 110 against rotation on the bolt 108. A finger 112 is integrally formed with the retainer 110 and is adapted to be positioned over the socket 103 to prevent the socket 103 from becoming disengaged from the ball 105 should the normal clamp actuated with the hand wheel 104 become broken or loosened. The retainer 110 can be swiveled to a position to permit disengagement of the socket 103 from the ball 105 when the wing nut 111 is loosened.

Having thus described the preferred embodiments of the invention it should be understood that numerous other modifications and adaptations may be resulted to without departing from the spirit of the invention.

What is claimed is:

1. A trailer safety coupler of the type which includes a ball rigidly secured to a hitch to a towing vehicle and a socket rigidly secured to a tongue on the trailing vehicle and adapted for releasable pivotal connection to the ball comprising a yoke having a pair of spaced apart arms secured to said tongue for pivotal movement about a longitudinal axis, a connector housing secured to said hitch for pivotal movement about the vertical axis of said ball, means on the ends of said yoke arms cooperating with means on said connector housing for releasably securing said yoke to said housing for pivotal movement about a transverse axis extending through the center of said ball.

2. A device as claimed in claim 1, wherein the means on said connector for releasably securing said yoke to said hitch includes a pair of slots formed in opposite sides of said housing with the means on said yoke arms extending into said slots for securing said yoke to said housing.

3. A device as claimed in claim 1, wherein said yoke is releasably secured to said tongue.

4. A device as claimed in claim 1, wherein said yoke is secured to said tongue for pivotal movement about a longitudinal and about a transverse axis.

5. A device as claimed in claim 1, wherein means are provided on said yoke retaining means for releasably locking said yoke therein.

* * * * *